United States Patent Office 3,367,900
Patented Feb. 6, 1968

3,367,900
PROCESS FOR METHYLISOCYANATE POLYMER
William P. Ter Horst, Rehoboth, Del., assignor to Chemetron Corporation, Chicago, Ill., a corporation of Delaware
No Drawing. Filed Nov. 5, 1964, Ser. No. 409,268
8 Claims. (Cl. 260—31.8)

ABSTRACT OF THE DISCLOSURE

Methylisocyanate is polymerized in the presence of a tetramethyldiamino-loweralkane catalyst. The polymerized product produced by this process is useful for preparing materials such as films and fibers.

---

This invention relates to a novel process for polymerizing an isocyanate monomer. More particularly, this invention relates to the catalyzing of a methylisocyanate monomer with a tetramethyldiamino-loweralkane.

Isocyanates have been utilized recently to produce homopolymers of organic isocyanates as described by Shashoua in U.S. 2,965,614. Various monovalent alkyl and aromatic substitute-isocyanates are described in the subject patent as being polymerized with an alkyl metal anionic catalyst at a temperature which must be below −20° C. In addition to the low temperature restriction, special solvents must be employed if polymethylisocyanate is to form instead of cyclic dimer and trimer compounds. Further, it has been found that when methylisocyanate is treated with sodium cyanide at the described temperatures and conditions, no polymerized material is formed except the trimer. As pointed out in the Shashoua patent, the isocyanate dimers and trimers are of relatively low molecular weight and of little or no commercial value for the production of shaped articles.

It is therefore an object of this invention to provide a novel process for preparing polymethylisocyanate. It is a further object of the present invention to provide a process for preparing a polymer from methylisocyanate which can be carried out without the use and maintenance of low temperatures or solvents. It is another object of this invention to provide a novel polymethylisocyanate polymer. It is still another object of this invention to provide a polymethylisocyanate polymer which is transparent, has a high impact strength at low temperatures and is nonflammable. Other objects of the present invention will be apparent to one skilled in the art from the accompanying description and claims which follow.

It has been found that methylisocyanate can be polymerized to commercially useful products by treating the monomer with a catalytic amount of tetramethyldiamino-loweralkane having the formula

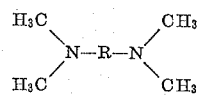

wherein R is a disubstituted lower alkane containing 1–7 carbon atoms inclusive, such as described in the following table:

| Derivative | Structure |
|---|---|
| Methylene | —CH$_2$— |
| Ethylene | —CH$_2$—CH$_2$— |
| Propylene | —CH$_2$—CH$_2$—CH$_2$— |
| Isopropylene | —CH$_2$—CH(CH$_3$)— |
| Dimethylmethylene | CH$_3$—C(CH$_3$)—CH$_3$ |
| Butylene | —CH$_2$—(CH$_2$)$_2$—CH$_2$— |
| Iso-butylene | —CH$_2$—CH(CH$_3$)—CH$_2$— |
| Secondary butylene | —CH$_2$—CH(CH$_2$—CH$_3$)— |
| Pentylene | —CH$_2$—(CH$_2$)$_3$—CH$_2$— |
| Diethylmethylene | —C$_2$H$_5$—C(C$_2$H$_5$)— |
| Methylpropylmethylene | CH$_3$—C(C$_3$H$_7$)— |
| 2,2-dimethylpropylene | —CH$_2$—C(CH$_3$)(CH$_3$)—CH$_2$— |
| Hexylene | —CH$_2$(CH$_2$)$_4$—CH$_2$— |
| 1,1,2,2-tetramethylethylene | —C(H$_3$C)(CH$_3$)—C(H$_3$C)(CH$_3$)— |
| 1-methyl-1-ethyl-2-methylethylene | —C(H$_3$C)(CH$_3$)—C(C$_2$H$_5$)— |
| 2,2-dimethylpropylene | —CH$_2$—C(CH$_3$)(CH$_3$)—CH$_2$— |
| Heptylene | —CH$_2$—(CH$_2$)$_5$—CH$_2$— |
| 2,2-diethylpropylene | —CH$_2$—C(C$_2$H$_5$)(C$_2$H$_5$)—CH$_2$— |
| 2,2,3-tetramethylbutylene | —CH$_2$—C(H$_3$C)(CH$_3$)—C(CH$_3$)—CH$_2$— |
| 3,3-dimethylpentylene | —CH$_2$—CH$_2$—C(CH$_3$)(CH$_3$)—CH$_2$—CH$_2$— |

All of the tetramethyldiamino-loweralkane compounds employed in the process of the present invention, and described in the formula in the preceding paragraph, are either commercially available or may be conveniently prepared by known reactions. For example, one method for preparing the tetramethyldiamino-loweralkanes is to react two moles of dimethylamine with the corresponding lower alkylenedichloride in the manner well known to those skilled in the art.

The formation of polymethylisocyanate instead of dimer and trimer formation when employing the tetramethyldiamino-loweralkanes described in the above general formula is highly unexpected because, as previously stated, this reaction does not occur with the catalyst of Shashoua nor would the following compounds cause the desired polymerization: N,N,N$^1$,N$^1$ - tetraethylethane - diamine, N,N,N$^1$ - trimethylethane - diamine, N,N - dimethylethane-diamine, N,N$^1$ - dimethylethane - diamine, ethylenediamine, propylenediamine, tetramethylene - diamine, hexamethylene-diamine, diethylene triamine, triethylene-tetramine, Dabco, which is commonly called triethylene-diamine, and is chemically 1,4-diazabicyclo(2,2,2)octane marketed by Houdry Process Corp., dimethyl formamide, tetramethylurea, trimethylamine, hexamethyl phosphorictriamide, 2-methylimidazole, hydrazodicarbonamide, glycol-uril, dimethylolurea, biuret, tris-1-aziridinyl-phosphineoxide, dimethylhydantoin, tri-allylamine, ethyleneurea. dicyandiamide, hexamethylenediamine-carbamate, pryidine, sodamide, azo-bis-isobutyronitrile, diethyl aminoethanol, ethylmorpholine, tetramethyl guanidine, hexamethyl-melamine, trimethyl nitrilopropionate. Further proof of the unexpected polymerization of methylisocyanate in the presence of a tetramethyldiamino-loweralkane is evidenced by the fact that whereas the methylisocyanate monomer will polymerize, other alkylisocyanates, methylisothiocyanate or allyl-isocyanate will not polymerize with a tetramethyldiamino-loweralkane.

The amount of the catalyst employed is not critical. As much as 5% by weight based on the methylisocyanate monomer can be employed but the amount can be reduced to 0.6% without affecting polymerization. The preferred amount of catalyst is 2%. A temperature of about 40° C. is preferred during the polymerization but a temperature range from 10° C. to 80° C. is also operable; however, a range of 40° C. to 60° C. is preferred. No solvent is required during the catalysis of the methylisocyanate by the tetramethyldiamino-loweralkane. However, the use of dioxane is preferred as a solvent for side reaction products as some minor amounts of dimer and trimer formed during the polymerization are soluble in the dioxane whereas the novel polymethylisocyanate polymer is not. Further with the use of the solvent, the catalyzation can be controlled to a greater extent.

The presence of trace amounts of water does not affect polymerization in any way. While it is preferred to have a water-free system, polymerization takes place even when a 50% catalyst-water solution is employed. The polymerization can be carried out in the presence of air or of nitrogen without any undesirable effect. However, iron does inhibit polymer formation. Therefore, glass, glass or resin lined, or stainless steel reactors should be employed.

The tetramethyldiamino catalysts are liquids and are soluble in the methylisocyanate monomer. The catalysts of this invention yield clear methylisocyanate polymers and are purchased and/or prepared economically. Purity of the methylisocyanate monomer is not critical for catalysis.

The polymer produced by the process of this invention is soluble in very few of the well recognized solvents for polymers. For example, the powerful solvents dimethylformamide, dimethyl sulfoxide and tetramethylurea do not dissolve it. The polymer is soluble in concentrated sulfuric acid, dichloracetic acid and trifluoracetic acid but it also degrades to an extent that an unsupported film cannot be cast from the solution. Likewise the polymer is soluble in primary amines such as cyclohexylamine and piperidine but also degrades. Chloroform is the only solvent found thus far which acts as a true solvent.

The chloroform solution of the methylisocyanate polymer is stable with no degradation on storage. From the chloroform solution, films are cast which are strong and tough especially at low temperatures. Fibers can also be spun from the chloroform solution. A good method to produce filaments is to extrude a chloroform solution of the polymer into carbontetrachloride, methylethylketone or dioxane. The polymer produced by the present novel process will not burn, does not support combustion and is self-extinguishing.

An important aspect of the present invention is the production of a methylisocyanate polymer having a softening point which until this invention was not obtainable with methylisocyanate. The softening as well as the melting points of the polymethylisocyanates produced by the present novel process is in the range of 160–210° C.

An outstanding property of the polymer produced by the method of this invention is its toughness at low temperatures. The material will not shatter when subjected to grinding in Dry Ice and its impact strength appears to double compared to its room temperatures properties. The properties of the polymer when formed into a sheet or fiber make it useful as a substitute for known plastics when it is desired to use such plastics at low temperatures such as for protective coverings, piping or as a substitute for glass. The produced polymer of this invention in the form of films can also be employed in place of vinyl plastic without the use of a plasticizer. The flame resistance and its transparency make the polymer useful as a protective material when impregnated in materials such as cellulose, leather, textiles, paper and the like. Ultimately polymerization may be effected in situ on the previously described materials.

The polymer of this invention can be plasticized, if desired, with dioctylphthalate as is evidenced by Example VI. Further, as shown in Example VII, methylisocyanate monomer can be polymerized with a tetramethyldiaminoloweralkane in the vapor phase.

The following specific examples are intended for the purpose of illustrating the present invention. They should not be construed as limiting the invention to the precise reactants, ingredients or conditions specified.

*Example I*

Into a glass pressure bottle having a capacity of 100 milliliters were charged 20 grams of methylisocyanate, which is more than 99% pure, and one gram of N,N,N$^1$, N$^1$-tetramethyl-1,3-propanediamine. The bottle was stoppered and heat applied to bring the temperature to 40–50° C. After two hours, polymerization was complete and the polymer formed in a white opaque solid mass. The polymer had a melting point of 160–190° C. and was dissolved in chloroform. From the chloroform solution a film was cast which was transparent, strong and flexible.

*Example II*

Into a three neck, 500 milliliter flask, provided with a reflux condenser and thermometer were charged 200 grams of methylisocyanate and 10 grams of N,N,N$^1$,N$^1$-tetramethyl-1,3-propanediamine and the contents heated under reflux. The liquid temperature was 42° C. at the time of charging and reached 52° C. after two hours of refluxing. A translucent polymer formed which was ground, extracted with dimethylformamide and the insoluble portion dissolved in chloroform and a film cast which was clear, strong and flexible.

*Example III*

The same materials and general procedures were employed as described in Example II except that the propanediamine catalyst was added in the following manner: 25% at the start, 25% one half hour later; 25% one hour after start, and 25% one and one half hours after start. The same translucent polymer was obtained as in Example II.

*Example IV*

The same procedures as outlined in Example I were followed employing 20 grams of methylisocyanate, which is more than 99% pure and one gram of N,N,N$^1$,N$^1$-tetramethylmethanediamine. A polymer formed in the manner therein described having the same physical characteristics.

*Example V*

Into a 2500-milliliter flask provided with a reflux condenser and thermometer were charged 200 grams of methylisocyanate and .75 gram of N,N,N$^1$,N$^1$-tetramethylethylenediamine. The mixture was heated under reflux conditions for two hours. The polymer is obtained in the form of a solid, translucent mass. A sample of the polymer formed was dissolved in chloroform and yielded a translucent, strong, self-supporting film. The softening point of the polymer was 186° C. and the melting point 202° C.

Example VI

This example illustrates the polymerization of methylisocyanate in the presence of dioctylphthalate plasticizer.

Into the same apparatus as described in Example II were charged 200 grams of methylisocyanate, 100 grams of dioctylphthalate and .75 gram of N,N,N¹,N¹-tetramethylethylenediamine. The resulting mixture was heated under reflux for five hours. The resulting polymer formed in a solid, opague mass and had a softening point of 193° C. and a melting point of 206° C. A film cast from a chloroform solution was translucent, flexible and strong.

Example VII

This example illustrates the polymerization of methylisocyanate with tetramethylethylenediamine in a vapor phase.

A 1% solution of N,N,N¹,N¹-tetramethylethylenediamine in methylisocyanate was cooled to 10° C. and atomized with nitrogen gas into a glass reactor tube heated to 40–45° C., the boiling point of the methylisocyanate being 41° C. Polymer formed on the walls of the tube and can be reamed therefrom periodically when a continuous process is desired.

From the foregoing description it will be seen that there is now provided a novel process for polymerizing methylisocyanate wherein polymerization is easily carried out without the need for low temperatures, solvents and consequent special equipment and excessive handling. No special precautions need be taken to provide an anhydrous reaction condition nor absolutely pure methylisocyanate monomer. The novel process results in yields which are nearly quantitative without formation of excessive amounts of the dimer and trimer. A continuous process is also provided through vapor phase polymerization. The polymethylisocyanate polymer obtained by the process of this invention is easily moldable and has good transparency.

Others may practice the invention in any of the numerous ways which will be suggested by this disclosure to one skilled in the art by employing one or more of the novel features disclosed or equivalents thereof. All such practice of the invention is considered to be a part hereof provided it falls within the scope of the appended claims.

I claim:

1. A process for polymerizing methylisocyanate consisting essentially of contacting methylisocyanate monomer with a catalytic amount of a catalyst consisting of a tetramethyldiamino-loweralkane compound of the formula

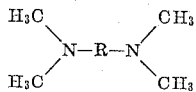

wherein R is a disubstituted lower alkane containing 1–7 carbon atoms, inclusive.

2. The process as defined in claim 1 wherein the amount of said tetramethyldiamino-loweralkane is about 2% by weight based on the methylisocyanate monomer.

3. The process as defined in claim 1 wherein said tetramethyldiamino-loweralkane is added periodically in equal portions to the methylisocyanate monomer.

4. The process as defined in claim 1 wherein said process is carried out in a vapor phase.

5. The process as defined in claim 1 wherein said process is carried out in the presence of dioctylphthalate as a plasticizer.

6. A process for polymerizing methylisocyanate consisting essentially of contacting methylisocyanate monomer with a catalytic amount of a catalyst consisting of N,N,N¹,N¹-tetramethylpropanediamine.

7. A process for polymerizing methylisocyanate consisting essentially of contacting methylisocyanate monomer with a catalytic amount of a catalyst consisting of N,N,N¹,N¹-tetramethylethanediamine.

8. A process for polymerizing methylisocyanate consisting essentially of contacting methylisocyanate monomer with a catalytic amount of a catalyst consisting of N,N,N¹,N¹-tetramethylmethanediamine.

References Cited

UNITED STATES PATENTS

| | | | |
|---|---|---|---|
| 2,965,614 | 12/1960 | Shashoua | 260—77.5 |
| 3,154,522 | 10/1964 | Beitchman | 260—77.5 |
| 3,300,432 | 1/1967 | Tarricone | 260—77.5 |

FOREIGN PATENTS 15,932 10/1962 Japan.

SAMUEL H. BLECH, *Primary Examiner.*